No. 887,343. PATENTED MAY 12, 1908.
J. A. McNEAL.
DUMPING MECHANISM FOR HARVESTING MACHINES.
APPLICATION FILED MAY 16, 1907.
3 SHEETS—SHEET 1.
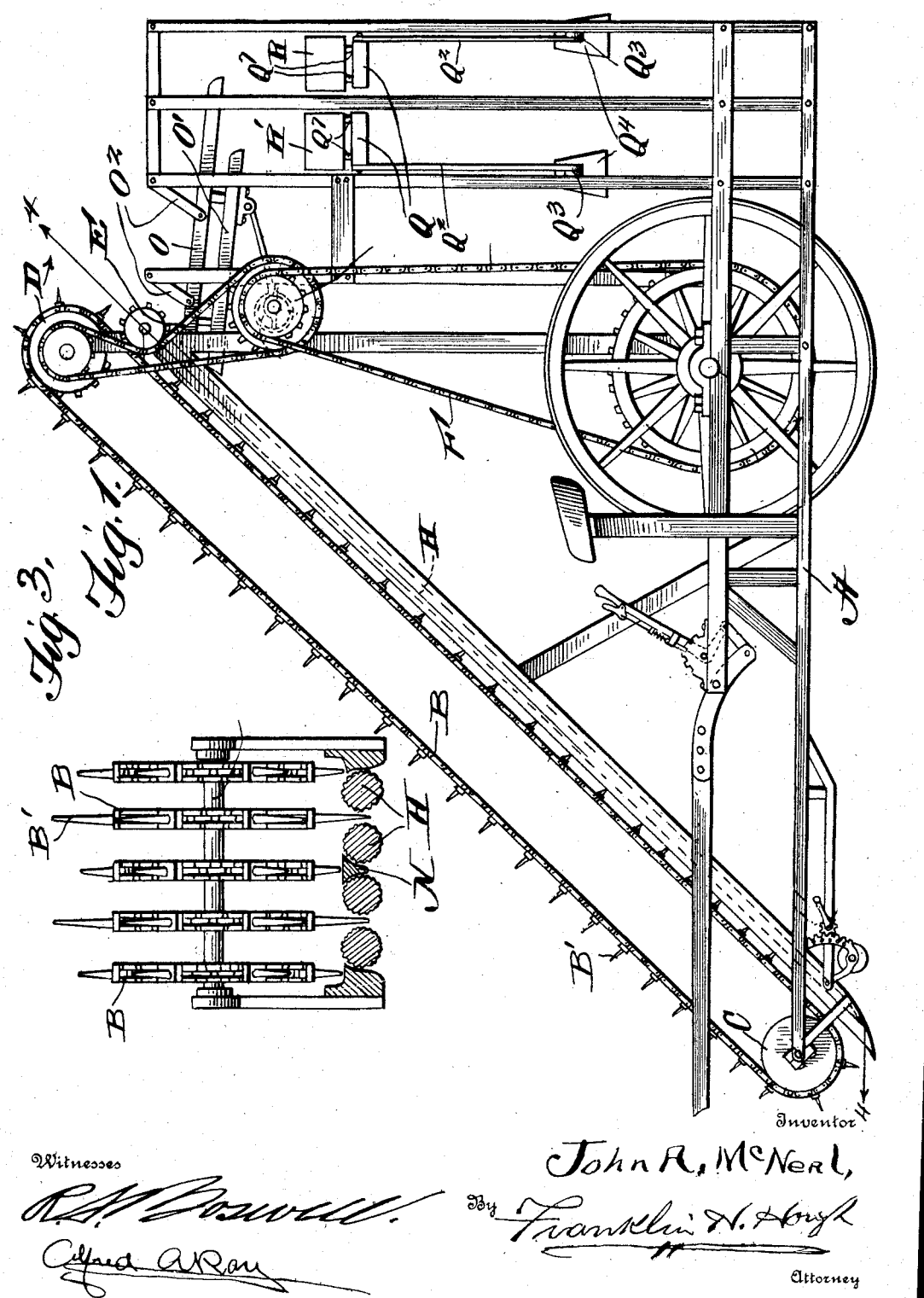
Witnesses
R. H. Boswell
Alfred A. Ray
Inventor
John R. McNeal,
By Franklin H. Hough
Attorney

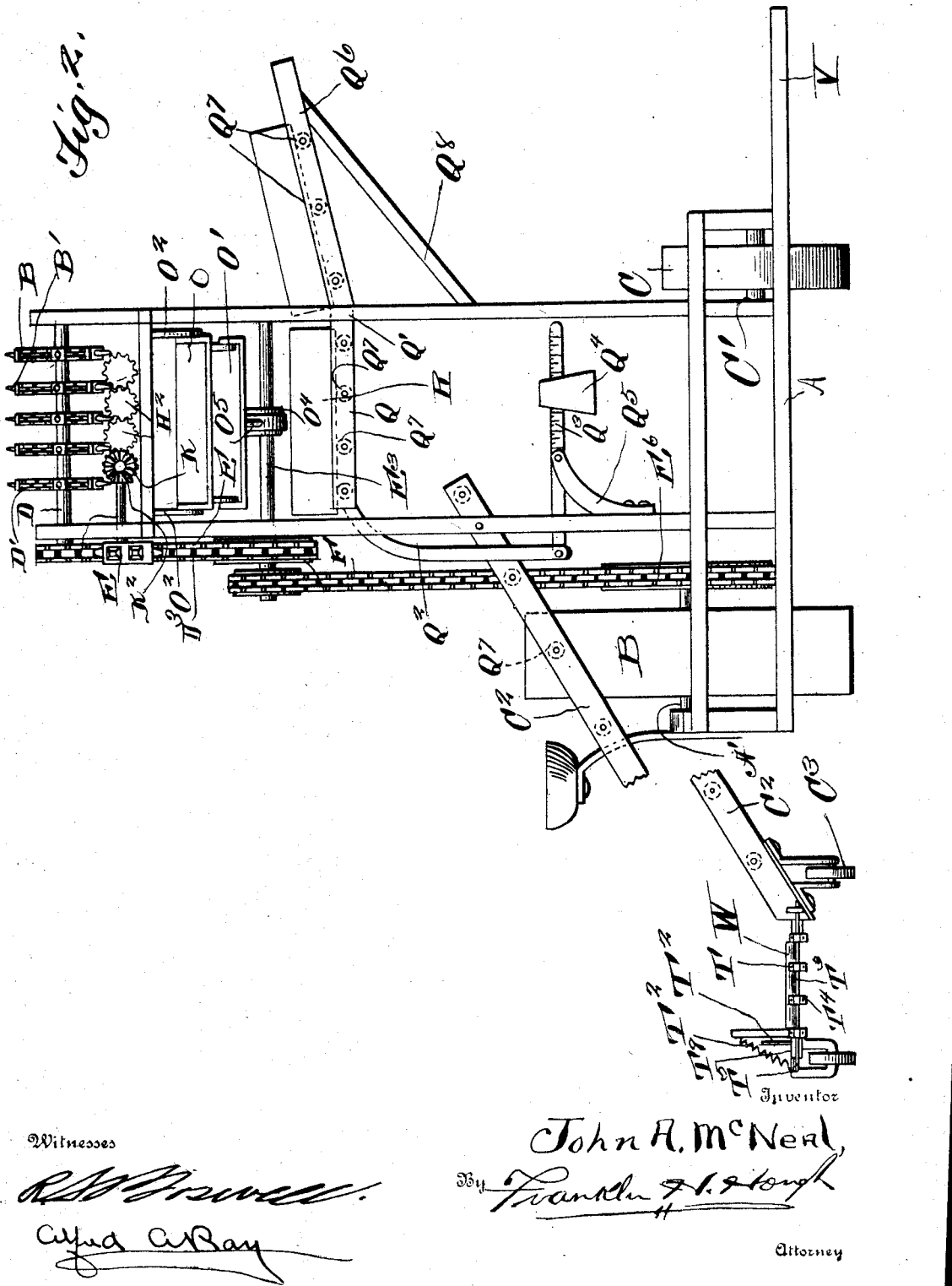

No. 887,343. PATENTED MAY 12, 1908.
J. A. McNEAL.
DUMPING MECHANISM FOR HARVESTING MACHINES.
APPLICATION FILED MAY 16, 1907.
3 SHEETS—SHEET 3.
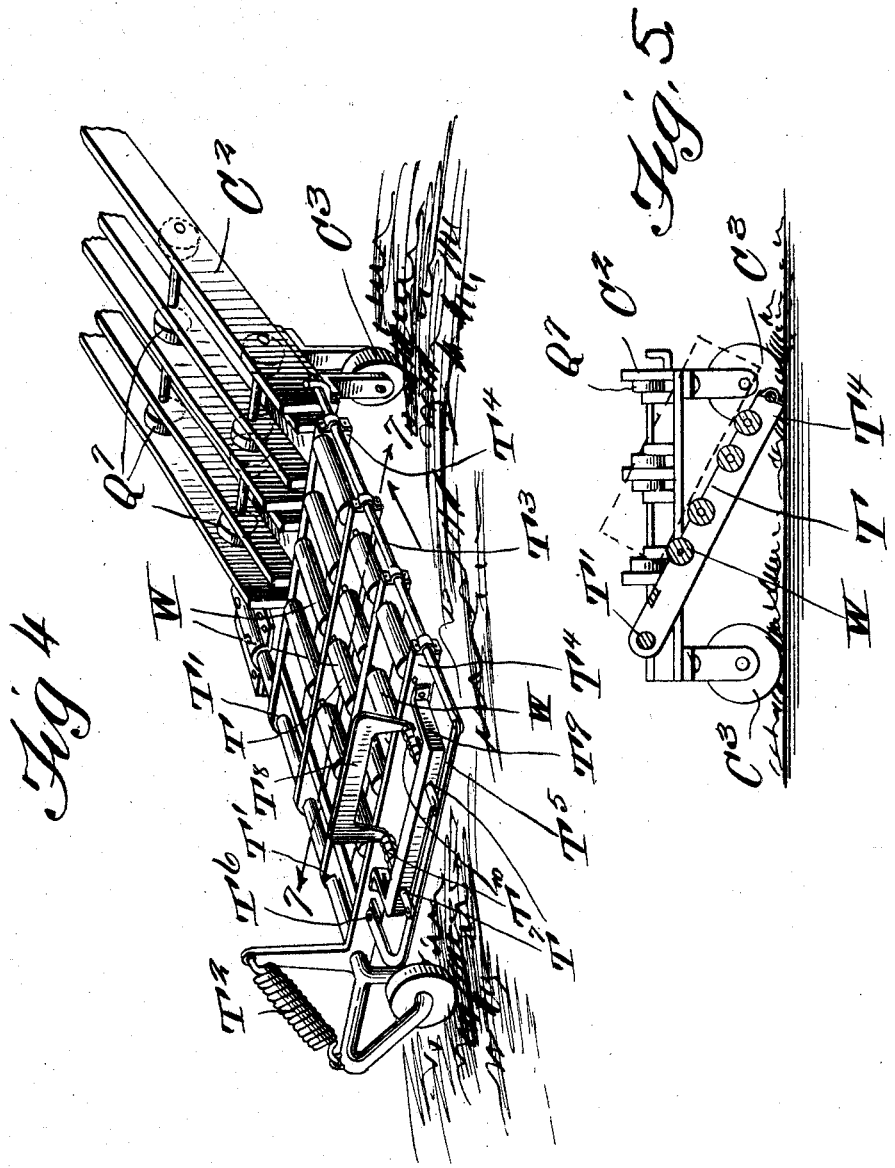
Witnesses:-
Inventor.
John A. McNeal,
By Franklin H. Hough
atty.

UNITED STATES PATENT OFFICE.

JOHN A. McNEAL, OF CHURUBUSCO, INDIANA.

DUMPING MECHANISM FOR HARVESTING-MACHINES.

No. 887,343.

Specification of Letters Patent.

Patented May 12, 1908.

Application filed May 16, 1907. Serial No. 373,888.

*To all whom it may concern:*

Be it known that I, JOHN A. MCNEAL, a citizen of the United States, residing at Churubusco, in the county of Whitley and State of Indiana, have invented certain new and useful Improvements in Dumping Mechanism for Harvesting-Machines; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in onion harvesters, and the object in view is to produce a simple and efficient apparatus of this nature so arranged that onions may be picked up, the tops severed therefrom, the onions elevated and deposited into separating screens from which they fall into crates positioned upon weighing platforms, and when a certain quantity of onions accumulate within a crate, they are automatically weighed and delivered to one side of the apparatus.

My invention comprises various details of construction and combinations and arrangements of parts which will be hereinafter fully described and then specifically defined in the appended claims.

I illustrate my invention in the accompanying drawings, in which:—

Figure 1 is a side elevation of my onion harvester, the chutes of the apparatus being removed. Fig. 2 is a rear elevation. Fig. 3 is a cross sectional view taken on line 5—5 of Fig. 3. Fig. 4 is a detail perspective view showing the dumping feature of the apparatus. Fig. 5 is a sectional view taken on line 7—7 of Fig. 4.

Reference now being had to the details of the drawings by letter, A designates a frame of a harvesting machine, in connection with which my apparatus is operated, said harvesting machine comprising an endless conveyer B with fingers B' thereon, which conveyer passes over sprocket wheels C and D and is driven by belted connections E and F with the driving axle of the apparatus.

In the drawings, I have shown rollers H set at inclinations and mounted in pairs and the upper ends of the rollers provided with intermeshing gear wheels driven by gear connection with the apparatus which drives the endless conveyer, and between the rollers are the angle plates N, over which the fingers of the sprocket chain pass.

Mounted underneath the upper end of the conveyer are the two shaking screens O and O', which screens are of different lengths, the upper screen O having preferably the larger mesh in order that the smaller onions may pass through the same upon the screen O', and one screen being longer than the other in order to deposit the larger onions into a crate R, while the smaller onions are allowed to fall into the crate R'. The screens are suspended by the links $O^2$ which are pivoted to upright portions of the frame and are vibrated by means of an eccentric $O^4$ which is fixed to the shaft $E^3$, shown clearly in Fig. 2 of the drawings, and $O^5$ designates an eccentric rod which is connected to a strap passing about said eccentric and is pivotally connected to the under side of the screen O', as shown clearly in Fig. 1 of the drawings. Said crates, when in position to receive the onions, are mounted upon the weighing platforms Q, each of which is pivotally connected at Q' at one end and its other end supported by an arm $Q^2$ which is pivotally connected to the weighing arm $Q^3$ upon which the balance $Q^4$ is mounted. Said weighing arm $Q^3$ is pivotally mounted upon a bracket arm $Q^5$ and is graduated, as shown clearly in Fig. 2 of the drawings.

$Q^6$ designates an inclined rack having rollers $Q^7$, as has also the platform Q, so that the crates may move with as little friction as possible. Said inclined rack $Q^6$ is supported by the brackets $Q^8$ and is adapted to hold the empty crates in readiness to take the place of those which have been filled.

At the lower end of the side delivery chute $C^2$, which latter is provided with anti-friction rollers, is a delivery rack T pivotally connected at its forward end, as at T', to the frame of the apparatus, and is normally held in a horizontal position by means of a spring $T^2$.

$T^3$ designates a latch, the free end of which is adapted to engage over the lower end of the side delivery chute for the purpose of supporting the free ends of the tines $T^4$ of said delivery rack to support the same, and to the outer end of the latch $T^3$ is pivotally connected a lever $T^5$ which is pivoted at $T^6$ to a projection upon the rack.

$T^7$ is a pin which is pivotally connected to the lever $T^5$, and has a head $T^8$ between which and the bracket T⁹, through which the pin passes, a spring T¹⁰ bears, said spring and pin serving as a buffer to break the force of the crate as it slides down the delivery chute upon the rack. A roller W is mounted upon the rack and upon which the crate is adapted to rest and affording means to facilitate the dropping of the crate when the rack is tilted at an inclination.

Referring to Fig. 2 of the drawings will be seen a platform V projecting from the frame and upon which an operator may stand, if desired, to be convenient in placing the crates upon the rack Q⁶.

The operation of my apparatus will be readily understood and is as follows. The machine being driven over one or more rows of onions, the points L will scoop up the onions from the ground with their tops clinging thereto, and these being caught by the fingers G' will be elevated onto the rollers which are rotated in pairs toward each other. As the tops of the onions are caught between the rollers and the onions at the same time being raised by said fingers, the tops will be severed from the onions, and any dirt or other foreign matter which may be elevated by the onions will pass between the rollers, and any onions which may come upon the angle plates intermediate the pairs of rollers will be moved by the fingers which pass over said plates either to one side or the other and caused to fall upon the rollers, and as the latter are rotating toward each other, the tops thereof will be drawn between the rollers and severed. The onions arriving at the upper ends of the rollers will drop upon the screens where they are separated, the smaller onions passing through the mesh of the upper screen, and as the screens are vibrated and set at inclinations, the onions will fall into their respective crates positioned upon the weighing platforms underneath the free ends of the screens. As a certain quantity of onions fall into a crate, the weighted platform will tilt at an inclination and the filled crate, the weight of which is predetermined by the placing of the weight upon the balancing arm Q³, will slide down the chute C² and coming in contact with the buffer, the latch will be released and the weight of the crate overcoming the spring which normally holds the rack T in a horizontal position, will cause the crate to tilt down to the ground. After the weight of the crate is released from the rack, the spring T² will return the rack to its normal position. As a crate slides from the platform, an empty one positioned adjacent to the one being filled will slide down the inclined rack and be positioned underneath the screens.

From the foregoing it will be seen that a simple and efficient apparatus is afforded, whereby onions may be pulled from the ground, elevated, the tops severed therefrom, screened, crated, weighed and delivered to the ground at one side of the apparatus, the entire operation being automatic as the machine travels over the field.

What I claim is:—

1. In combination with a harvesting apparatus, a counter-balanced tilting platform, a chute leading therefrom, a delivery rack at the end of the chute, and means for tilting said delivery rack, as set forth.

2. In combination with a harvesting apparatus, a counter-balanced tilting platform, a chute leading therefrom, a delivery rack normally held in a horizontal position below the lower end of the chute, and means for releasing said rack to allow it to tilt as a receptacle is delivered thereon, as set forth.

3. In combination with a harvesting apparatus, a counter-balanced tilting platform, a chute leading therefrom, a delivery rack normally held in a horizontal position below the lower end of the chute, means for releasing said rack to allow it to tilt as a receptacle is delivered thereon, and means for returning the rack to a horizontal position, as set forth.

4. In combination with a harvesting apparatus, a counter-balanced tilting platform, a chute leading therefrom, a delivery rack at the lower end of the chute upon which a receptacle is adapted to be delivered, and a spring-pressed latch for normally holding the delivery rack in a horizontal position, as set forth.

5. In combination with a harvesting apparatus, a counter-balanced tilting platform, a chute leading therefrom, a delivery rack at the lower end of the chute upon which a receptacle is adapted to be delivered, a spring-pressed latch for normally holding the delivery rack in a horizontal position, and a buffer mounted upon the delivery rack, as set forth.

6. In combination with a harvesting apparatus, a counter-balanced tilting platform, a chute leading therefrom, a delivery rack at the lower end of the chute upon which a receptacle is adapted to be delivered, a spring-pressed latch for normally holding the delivery rack in a horizontal position, a spring-actuated buffer upon the rack, and connections between said buffer and latch, as set forth.

In testimony whereof I hereunto affix my signature in the presence of two witnesses.

JOHN A. McNEAL.

Witnesses:
 G. W. KICHLER,
 CHARLOTTE AUMAN.